(12) United States Patent
Geng et al.

(10) Patent No.: US 11,539,910 B2
(45) Date of Patent: Dec. 27, 2022

(54) DISPLAY CONTROL SYSTEM, DISPLAY APPARATUS AND CONTROL METHOD

(71) Applicant: BOE Technology Group Co., Ltd., Beijing (CN)

(72) Inventors: Lihua Geng, Beijing (CN); Xitong Ma, Beijing (CN); Yanfu Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/324,128

(22) Filed: May 19, 2021

(65) Prior Publication Data
US 2022/0060652 A1    Feb. 24, 2022

(30) Foreign Application Priority Data

Aug. 18, 2020   (CN) .......................... 202010830456.6

(51) Int. Cl.
| | | |
|---|---|---|
| G09G 3/00 | (2006.01) | |
| H04N 5/46 | (2006.01) | |
| H04N 5/38 | (2006.01) | |
| H04N 5/04 | (2006.01) | |

(52) U.S. Cl.
CPC .................. *H04N 5/46* (2013.01); *G09G 3/00* (2013.01); *H04N 5/04* (2013.01); *H04N 5/38* (2013.01); *G09G 2320/00* (2013.01); *G09G 2320/02* (2013.01)

(58) Field of Classification Search
None
See application file for complete search history.

(56) References Cited

U.S. PATENT DOCUMENTS

| | | | | |
|---|---|---|---|---|
| 2008/0106510 | A1* | 5/2008 | Yin ......................... | G09G 3/20 |
| | | | | 345/98 |
| 2008/0165083 | A1* | 7/2008 | Brodersen .............. | H04N 7/163 |
| | | | | 345/3.3 |
| 2014/0009678 | A1* | 1/2014 | Kimoto .............. | H04N 21/4621 |
| | | | | 348/473 |
| 2017/0244929 | A1* | 8/2017 | Zhong ................ | H04N 21/4104 |

* cited by examiner

*Primary Examiner* — Matthew Yeung
(74) *Attorney, Agent, or Firm* — Ling Wu; Stephen Yang; Ling and Yang Intellectual Property

(57) ABSTRACT

Provided are a display module control system, a display apparatus, a control method, a computer device and a medium. The display module control system includes a display module, a display controller driving the display module and a bridge unit connecting the display module and the display controller, wherein the display controller is configured to output a first video signal according to an external video source; the bridging unit is configured to determine whether the display controller is in normal operation state according to the first video signal received, output the first video signal to the display module to play the first video signal when the display controller is in normal operation state, and output a second video signal pre-stored to the display module to play the second video signal when the display controller is not in normal operation state.

18 Claims, 2 Drawing Sheets

FIG. 1

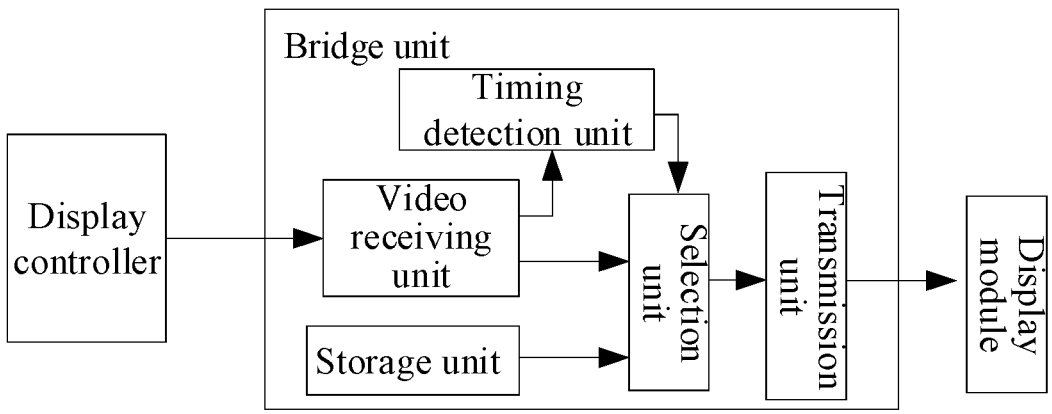

FIG. 2

Determining whether a display controller is in normal operation state according to a first video signal received, wherein the first video signal is output by the display controller according to an external video source Outputting the first video signal to a display module to play the first video signal when the display controller is in normal operation state, and outputting a second video signal pre-stored to the display module to play the second video signal when the display controller is not in normal operation state

FIG. 3

DISPLAY CONTROL SYSTEM, DISPLAY APPARATUS AND CONTROL METHOD

CROSS-REFERENCE TO RELATED APPLICATION

The present application claims the priority of the Chinese Patent Application No. 202010830456.6, filed to the CNIPA on Aug. 18, 2020, the content of which is hereby incorporated by reference.

TECHNICAL FIELD

Embodiments of the present disclosure relate to, but are not limited to, the technical field of display, in particular to a display module control system, a control method, and a related device.

BACKGROUND

The display input of the general display module is VBO (Video-By-One) interface. When the VBO interface is not connected or driven, the display module will display a Built-in Self Test (BIST) image (i.e., multiple images in a single color, such as white, gray, red, green, blue, or black, are displayed in cycle). Only when the VBO interface is connected and driven, and an effective image signal is transmitted to the module, will the BIST image disappear and the transmitted image be displayed.

SUMMARY

The following is a summary of subject matter described in detail herein. This summary is not intended to limit the protection scope of the claims.

In a first aspect, an embodiment of the present disclosure provides a display module control system, including a display module, a display controller driving the display module, and a bridge unit connecting the display module and the display controller, wherein the display controller is configured to output a first video signal according to an external video source; and the bridge unit is configured to determine whether the display controller is in normal operation state according to the first video signal received, output the first video signal to the display module to play the first video signal when the display controller is in normal operation state, and output a second video signal pre-stored to the display module to play the second video signal when the display controller is not in normal operation state.

In a second aspect, an embodiment of the present disclosure provides a display apparatus, including the aforementioned display module control system.

In a third aspect, an embodiment of the present disclosure provides a control method applied in the aforementioned display module control system, including:

determining, by a bridge unit of the display module control system, whether a display controller is in normal operation state according to a first video signal received, wherein the first video signal is output by the display controller according to an external video source; and outputting the first video signal to a display module to play the first video signal when the display controller is in normal operation state, and outputting a second video signal pre-stored to the display module to play the second video signal when the display controller is not in normal operation state.

In a fourth aspect, an embodiment of the present disclosure provides a non-transitory computer readable storage medium storing a computer program, wherein the aforementioned control method is implemented when the computer program is executed by a processor.

In a fifth aspect, an embodiment of the present disclosure provides a computer device including a processor and a memory storing a computer program that is executable on the processor, wherein the aforementioned control method is implemented when the computer program is executed by the processor. Other aspects will become apparent upon reading and understanding accompanying drawings and the detailed description.

BRIEF DESCRIPTION OF DRAWINGS

In order to describe technical solutions in embodiments of the present disclosure more clearly, the drawings to be used in the embodiments of the present invention will be introduced below in brief. The drawings described below are only some of the embodiments of the present disclosure, and one skilled in the art may obtain other drawings according to these drawings without paying any inventive effort.

FIG. 1 shows a structural block diagram of the display module control system according to an embodiment of the present disclosure;

FIG. 2 shows a structural diagram of the display module control system according to an embodiment of the present disclosure;

FIG. 3 shows a flowchart of the control method according to an embodiment of the present disclosure.

DETAILED DESCRIPTION

Figure 4:
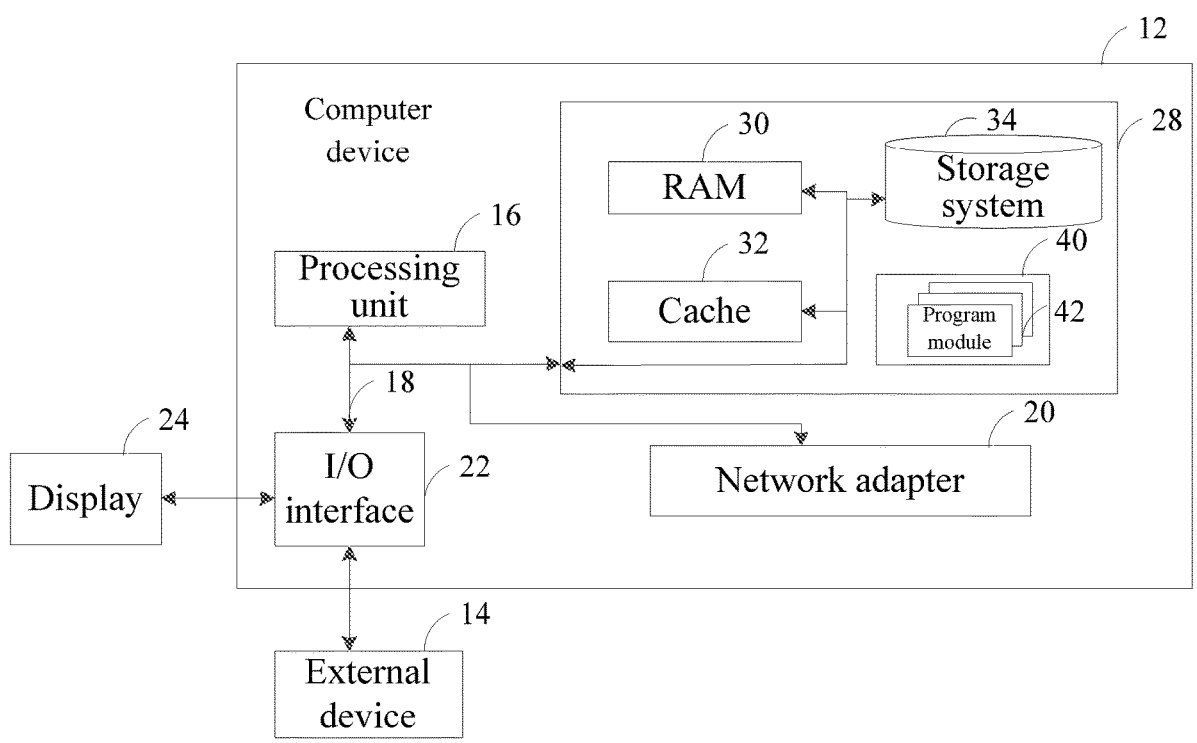
FIG. 4 is a schematic structural diagram of the computer device according to an embodiment of the present disclosure.

The following description will be made with reference to embodiments and drawings. Similar components in the drawings are indicated by the same reference signs. It should be understood by those skilled in the art that what is described below is illustrative but not restrictive, and should not be used to limit the scope of protection of the present disclosure.

A front display controller of a display module processes an image input from an external video interface and then transmits it to the display module through a VBO interface, and the display module displays the image output by the display controller. The display controller and the display module are connected by the VBO interface. After being powered on, the display controller needs an initialization process, including waiting for the clock system to stabilize, loading programs, etc., then starts VBO communication, and initiates an initialization process with the VBO at the display module side, including link training, etc. After successful initialization, the display controller transmits an image to the display module, and then the display module displays. Because it takes time to initialize the display controller, initialize and connect the VBO interface, if this time is too long, the display module will enter the BIST mode and display the self-test image if there is no effective drive within this period of time, that is, the display module will display the BIST image first after booting up, and then display a normal image after a period of time, which is unacceptable for display products.

An embodiment of the present disclosure proposes that the initialization time of the display controller should be shortened as much as possible, and there is generally no problem for systems such as SoC (System on Chip) with relatively fast initialization. However, for a display system similar to Field Programmable Gate Array (FPGA) based display systems, it takes a long time since FPGA initialization and programming are needed. For example, if the programming file of a small-capacity FPGA is relatively small, the programming speed is high. Usually, it takes several hundred milliseconds and the above problem will not occur. However, for large-scale FPGA with large capacity, the programming file is relatively large, and the programming time is up to 2 to 3 seconds, resulting in poor user experience.

As shown in FIG. 1, an embodiment of the present disclosure provides a display module control system, including a display module, a display controller driving the display module, and a bridge unit connecting the display module and the display controller, wherein the display controller is configured to output a first video signal according to an external video source; and the bridge unit is configured to determine whether the display controller is in normal operation state according to the first video signal received, output the first video signal to the display module to play the first video signal when the display controller is in normal operation state, and output a second video signal pre-stored to the display module to play the second video signal when the display controller is not in normal operation state.

In this embodiment, a bridge unit for buffering is arranged between the display module and the display controller. On the one hand, the bridge unit detects whether the display controller completes initialization and starts normal operation according to the video signal transmitted by the display controller, and on the other hand, it transmits a pre-stored boot display video signal (i.e., a second video signal) to the display module when the display controller does not enter normal operation, thus avoiding the problem that the display module outputs a self-test image due to not receiving a valid video signal during the initialization process of the display controller, therefore effectively improving the user experience and having a wide range of application prospects.

The bridge unit is a hardware unit, such as a field programmable gate array (FPGA), or a non-transient computer readable storage medium. For example, it may be a computer device including a processor and a memory storing a computer program that is executable on the processor.

In an exemplary embodiment, as shown in FIGS. 1 and 2, the bridge unit includes a video receiving unit, a timing detection unit, a storage unit, a selection unit and a transmission unit, wherein the video receiving unit is connected with the display controller and configured to receive the first video signal output by the display controller, transmit the first video signal to the selection unit, and transmit a timing signal and a frame data of the first video signal to the timing detection unit; the timing detection unit is configured to detect whether the timing signal and the frame data of the first video signal are normal and transmit a detection result to the selection unit; the storage unit is configured to store the second video signal and transmit the second video signal to the selection unit; the selection unit is configured to selectively output the first video signal or the second video signal to the transmission unit according to the detection result; the transmission unit is connected with the display module and configured to transmit the received first video signal or second video signal to the display module.

In an exemplary embodiment, the bridge unit receives the first video signal to be displayed through the video receiving unit connected with the display controller. In an example, the video receiving unit includes a first communication interface configured to establish a communication connection with the display controller. In another example, the first communication interface may be a VBO interface, and the video receiving unit establishes a communication connection with the display controller through the VBO interface and is able to receive the first video signal transmitted by the display controller.

In an exemplary embodiment, the video receiving unit performs signal processing on the first video signal, extracts a timing signal from the first video signal, and transmits the timing signal of the first video signal to the timing detection unit and the first video signal to the selection unit. In an example, the timing signal includes a field synchronization signal, a row synchronization signal and a data enable signal of the first video signal.

In an exemplary embodiment, the bridge unit outputs a video signal to be played through the transmission unit connected with the display module. In an example, the transmission unit includes a second communication interface configured to establish a communication connection with the display module. In another example, the second communication interface is the VBO interface, and outputs a video signal to the display module through the link established between the VBO interface and the display module.

In an exemplary embodiment, the first communication interface is further configured to receive a first video signal output by the display controller; the second communication interface is further configured to transmit the received first video signal or second video signal to the display module.

Embodiments of the present disclosure do not limit the format of the video signal interface, which can be selected by those skilled in the art according to the actual application requirements, and will not be described in detail here.

In an exemplary embodiment, the timing detection unit may be configured to detect according to the timing signal of the first video signal received, and determine whether the display controller completes initialization and is already in normal operation state. For example, in an example, the timing detection unit pre-stores a field synchronization signal threshold, a row synchronization signal threshold and a data enable signal threshold of a video signal output by the display controller under normal operation state, and a preset pixel row data threshold and a preset pixel column data threshold, and detects a timing signal and a frame data transmitted by the video receiving unit through the plurality of stored signal thresholds. When the plurality of signals all meet threshold signals, the timing detection unit determines that the display controller has completed initialization and entered normal operation state, and the timing detection unit outputs a first detection result to the selection unit. When the display controller is not in normal operation state, the timing detection unit outputs a second detection result to the selection unit. In an example, the resolution of the first video signal output by the display controller is FHD (i.e., 1920×1080). If the timing detection unit detects that the pixel row data of the frame data is stable 1080 and the pixel column data is stable 1920, it indicates that the frame data is normal and the timing signal is normal, indicating that the display controller has entered the normal operation state, and outputs the first detection result. In another example, where the resolution of the first video signal output by the display controller is FHD (i.e., 1920×1080), when the timing detection unit detects that the pixel row data of the frame data is unstable to 1080 and the pixel column data is unstable to 1920, it indicates that the frame data is abnormal, and/or if the timing signal is abnormal, it indicates that the display controller has not entered the normal operation state, and outputs a second detection result.

In an exemplary embodiment, the timing detection unit is configured to detect whether the timing signal and the frame data of the first video signal both meet corresponding preset thresholds, output a first detection result when both meet the corresponding preset thresholds, and output a second detection result when any one of the timing signal and the frame data of the first video signal does not meet corresponding preset thresholds. The selection unit is configured to selectively output the first video signal to the transmission unit according to the first detection result and to selectively output the second video signal to the transmission unit according to the second detection result.

In an exemplary embodiment, the storage unit may be a storage device arranged on the bridge unit, which is configured to store the second video signal and transmit the second video signal to the selection unit after power-on initialization. In an example, the second video signal is a boot screen, and the boot screen is displayed after the display module is powered on and initialized.

In an exemplary embodiment, the selection unit may be configured to selectively output the first video signal or the second video signal to the transmission unit according to the detection result. In an example, when the detection result is the first detection result, the first video signal is selected to be output to the transmission unit, and when the detection result is the second detection result, the second video signal is selected to be output to the transmission unit.

In an exemplary embodiment, because the bridge unit is small in size, for example, it is a small-scale PFGA, and the time for its power-on initialization is much shorter than the time for the initialization of the display controller, the second video signal is output to the transmission unit during the initialization process of the display controller, thus avoiding playing the BIST image after the power-on initialization of the display module due to lack of displayable video signal.

Corresponding to the display module control system provided by the above embodiment, an embodiment of the present disclosure further provides a control method using the aforementioned display module control system. Since the control method provided by this embodiment of the present disclosure corresponds to the display module control system provided by the above embodiments, the previous embodiments are also applicable to the control method provided by this embodiment and will not be described in detail in this embodiment.

As shown in FIG. 3, an embodiment of the present disclosure provides a control method applied to the aforementioned display module control system, including: determining, by a bridge unit of the display module control system, whether a display controller is in normal operation state according to a first video signal received, wherein the first video signal is output by the display controller according to an external video source; outputting the first video signal to a display module to play the first video signal when the display controller is in normal operation state, and outputting a second video signal pre-stored to the display module to play the second video signal when the display controller is not in normal operation state.

In this embodiment, a bridge unit for buffering is arranged between the display module and the display controller. On the one hand, the bridge unit detects whether the display controller completes initialization and starts normal operation according to the video signal transmitted by the display controller, and on the other hand, it transmits a pre-stored boot display video signal (i.e., a second video signal) to the display module when the display controller does not enter normal operation, thus avoiding the problem that the display module outputs a self-test image due to not receiving a valid video signal during the initialization process of the display controller, therefore effectively improving the user experience and having a wide range of application prospects.

In an exemplary embodiment, the bridge unit includes a video receiving unit, a timing detection unit, a storage unit, a selection unit and a transmission unit. Determining whether the display controller is in normal operation state according to the first video signal received includes: receiving, by the video receiving unit, the first video signal output by the display controller, transmitting the first video signal to the selection unit, and transmitting a timing signal and a frame data of the first video signal to the timing detection unit; and detecting, by the timing detection unit, whether the timing signal and the frame data of the first video signal are normal or not, and transmitting a detection result to the selection unit. Outputting the first video signal to the display module to play the first video signal when the display controller is in normal operation state, and outputting the second video signal pre-stored to the display module to play the second video signal when the display controller is not in normal operation state includes: transmitting, by the storage unit, the second video signal pre-stored to the selection unit; selectively outputting, by the selection unit, the first video signal or the second video signal to the transmission unit according to the detection result; and transmitting, by the transmission unit, the first video signal or the second video signal received to the display module to play the video signal received.

For the implementation of this exemplary embodiment, reference may be made to the previous embodiments, which will not be repeated here.

In an exemplary embodiment, the timing signal includes a field synchronization signal, a row synchronization signal and a data enable signal of the first video signal, and the frame data includes pixel row data and pixel column data.

In an exemplary embodiment, detecting, by the timing detection unit, whether the timing signal and the frame data of the first video signal are normal or not, and transmitting the detection result to the selection unit includes: detecting, by the timing detection unit, whether the timing signal and the frame data of the first video signal both meet corresponding preset thresholds, outputting a first detection result when both meet the corresponding preset thresholds, and outputting a second detection result when any one of the timing signal and the frame data of the first video signal does not meet corresponding preset thresholds. Selectively outputting, by the selection unit, the first video signal or the second video signal to the transmission unit according to the detection result includes: selectively outputting, by the selection unit, the first video signal to the transmission unit according to the first detection result, and selectively outputting the second video signal to the transmission unit according to the second detection result.

For the implementation of this exemplary embodiment, reference may be made to the previous embodiments, which will not be repeated here.

In an exemplary embodiment, the video receiving unit includes a first communication interface, and the transmission unit includes a second communication interface. Before determining whether the display controller is in normal operation state according to the received first video signal, the control method further includes: establishing a communication connection with the display controller using the first communication interface; and establishing a communication connection with the display module using the second communication interface.

In an exemplary embodiment, receiving, by the video receiving unit, the first video signal output by the display controller, includes: receiving the first video signal output by the display controller using the first communication interface. Transmitting, by the transmission unit, the first video signal or second video signal received to the display module to play the video signal received includes: transmitting the first video signal or second video signal received to the display module using the second communication interface.

For the implementation of this exemplary embodiment, reference may be made to the previous embodiments, which will not be repeated here.

In an exemplary embodiment, after the display module control system is powered on, the display module, the display controller and the bridge unit are initialized respectively, including:

the bridge unit completes the program loading, and the bridge unit includes a video receiving unit, a timing detection unit, a storage unit, a selection unit and a transmission unit;

the first communication interface of the video receiving unit of the bridge unit establishes a VBO connection with the display controller, receives a first video signal transmitted by the display controller, transmits the first video signal to the selection unit, and transmits a timing signal and a frame data of the first video signal to the timing detection unit;

the second communication interface of the transmission unit of the bridge unit establishes a VBO connection with the display module and is able to transmit a video signal to the display module; and the storage unit of the bridge unit transmits a second video signal to the selection unit.

The timing detection unit of the bridge unit detects the timing signal and the frame data of the first video signal, determines whether the display controller completes initialization and enters normal operation state according to the timing signal and the frame data, outputs a first detection result when the display controller has entered normal operation state, and outputs a second detection result when the display controller is not in normal operation state.

The selection unit of the bridge unit selectively output a video signal to be output to the transmission unit according to the received detection result. For example, when the detection result is the first detection result, the first video signal is selected to be output to the transmission unit, and when the detection result is the second detection result, the second video signal is selected to be output to the transmission unit.

So far, at the power-on stage, on the one hand, the bridge unit arranged between the display module and the display controller detects whether the display controller completes initialization and starts normal operation according to the video signal transmitted by the display controller, and on the other hand, it transmits a pre-stored boot display video signal to the display module when the display controller does not enter normal operation, thus avoiding the problem that the display module outputs a self-test image due to not receiving a valid video signal during the initialization process of the display controller, therefore effectively improving the user experience and having a wide range of application prospects.

Based on the aforementioned display module control system, an embodiment of the present disclosure provides a display apparatus, including the aforementioned display module control system. The display apparatus may be any product or component with a display function such as a mobile phone, a tablet computer, a television, a display, a laptop computer, a digital photo frame, or a navigator.

An embodiment of the present disclosure provides a non-transitory computer readable storage medium storing a computer program, wherein when the computer program is executed, the following actions are implemented: determining whether a display controller is in normal operation state according to a first video signal received, wherein the first video signal is output by the display controller according to an external video source; outputting the first video signal to a display module to play the first video signal when the display controller is in normal operation state, and outputting a second video signal pre-stored to the display module to play the second video signal when the display controller is not in normal operation state.

In practical application, the computer readable storage medium may adopt any combination of one or more computer readable media. The computer readable medium may be a computer readable signal medium or a computer readable storage medium. The computer readable storage medium may be, for example, but not limited to, an electrical, magnetic, optical, electromagnetic, infrared, or semiconductor system, apparatus or device, or a combination of any of the above. Examples (non-exhaustive list) of computer readable storage media include electrical connections with one or more wires, portable computer disks, hard disks, random access memories (RAM), read-only memories (ROM), erasable programmable read-only memories (EPROM or flash memories), optical fibers, portable compact disk read-only memories (CD-ROM), optical storage devices, or magnetic storage devices, or any suitable combination of the above. In an embodiment of the present disclosure, the computer readable storage medium may be any tangible medium including or storing a program, which may be used by or in combination with an instruction execution system, apparatus or device.

The computer readable signal medium may include a data signal propagated in baseband or as a part of a carrier wave, in which a computer readable program code is carried. This propagated data signal may in various forms, including but not limited to electromagnetic signals, optical signals, or any suitable combination of the above. The computer readable signal medium may be any computer readable medium other than a computer readable storage medium, which may transmit, propagate or send a program for use by or in connection with an instruction execution system, apparatus or device.

The program code included on the computer readable medium may be transmitted by any suitable medium, including but not limited to wireless, electric wire, optical cable, or RF (Radio Frequency), or any suitable combination of the above.

The computer program code for executing the operation of embodiments of the present disclosure may be written in one or more programming languages or combinations thereof, including object-oriented programming languages such as Java, Smalltalk, or C++, or conventional procedural programming languages such as "C" language or similar programming languages. The program code may be completely executed on the user computer, partially executed on the user computer, executed as an independent software package, executed partially on the user computer and partially on a remote computer, or completely executed on a remote computer or server. In a case involving a remote computer, the remote computer may be connected to a user computer through any kind of network including a local area network (LAN) or a wide area network (WAN), or may be connected to an external computer (for example, connected through the Internet using an Internet service provider).

FIG. 4 shows a schematic structural diagram of a computer device according to an embodiment of the present disclosure. The computer device 12 shown in FIG. 4 is only an example, and should not bring any limitation to the functions and use scope of the embodiment of the present disclosure.

As illustrated in FIG. 4, the computer device 12 is represented in the form of a general-purpose computing device. Components of the computer device 12 may include, but are not limited to, one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include, but are not limited to, Industry Standard Architecture (ISA) bus, Micro-channel Architecture (MAC) bus, Enhanced ISA bus, Video Electronics Standards Association (VESA) local bus or Peripheral Component Interconnect (PCI) bus.

The computer device 12 includes various computer system readable media. These media may be any usable medium that may be accessed by the computer device 12, including volatile or non-volatile media, removable or non-removable media.

The system memory 28 may include computer system readable media in the form of volatile memory, such as a Random Access Memory (RAM) 30 and/or a cache memory 32. Or the computer device 12 may further include other removable/non-removable, volatile/non-volatile computer system storage media. As an example, the storage system 34 may be configured to read from and write to non-removable, non-volatile magnetic media (not illustrated in FIG. 4, and usually called "a hard disk driver"). Although not illustrated in FIG. 4, a magnetic disk driver configured to read from and write to the removable non-volatile magnetic disc (such as "a diskette"), and an optical disc driver configured to read from and write to a removable non-volatile optical disc (such as a CD-ROM, a DVDROM or other optical media) may be provided. Under these circumstances, each driver may be connected with the bus 18 by one or more data medium interfaces. The memory 28 may include at least one program product. The program product has a set (for example, at least one) of program modules, and these program modules are configured to execute functions of any one of the embodiments of the present disclosure.

A program/utility tool 40 having a set (at least one) of program modules 42 may be stored in the memory 28 for example. Such program module 42 includes, but is not limited to, an operating system, one or more application programs, other program modules or program data. Each of these examples or a certain combination may include an implementation of a network environment. The program module 42 usually executes functions and/or methods described in embodiments described in the present disclosure.

The computer device 12 may communicate with one or more external devices 14 (such as a keyboard, a pointing device, or a display 24), or may further communicate with one or more devices enabling a user to interact with the computer device 12, or may communicate with any device (such as a network card, or a modem) enabling the computer device 12 to communicate with one or more other computer devices. Such communication may occur via an Input/Output (I/O) interface 22. The computer device 12 may communicate with one or more networks (such as Local Area Network (LAN), Wide Area Network (WAN) and/or public network, such as Internet) via a network adapter 20. As illustrated in FIG. 4, the network adapter 20 communicates with other modules of the computer device 12 via the bus 18. It should be understood that, although not illustrated in FIG. 4, other hardware and/or software modules may be used in combination with the computer device 12, including but not limited to: microcode, device drivers, redundant processing units, external disk drive arrays, RAID (Redundant Array of Independent Disks) systems, tape drives, or data backup storage systems, etc.

The processing unit 16 may, by operating programs stored in the system memory 28, executes various function applications and data processing, for example, implements a control method of a bridge unit applied to a display module control system provided by an embodiment of the present disclosure. According to the embodiments of the present disclosure, a bridge unit is arranged between the display module and the display controller. The bridge unit detects whether the display controller completes initialization and starts to work normally on the one hand, and transmits a pre-stored boot display video signal to the display module on the other hand, which may avoid the problem that the display module outputs a self-test image caused by too long power-on initialization time of the display controller, thereby effectively improving the user experience and having a wide application prospect.

Obviously, the above embodiments of the present disclosure are only examples for clearly explaining the present disclosure, but are not a limitation of the implementation of the present disclosure. For those ordinary skilled in the art, other changes or variations in different forms may be made on the basis of the above description, and all the implementations may not be exhaustive here. Any obvious changes or modifications derived from the technical solution of the present disclosure are still within the protection scope of the present disclosure.

What we claim is:

1. A display control system, comprising:
a display, a display controller driving the display, and a bridge circuit connecting the display and the display controller, wherein
the display controller is configured to output a first video signal according to an external video source; and
the bridge circuit is configured to determine whether the display controller is in normal operation state according to the first video signal received, output the first video signal to the display to play the first video signal when the display controller is in normal operation state, and output a second video signal pre-stored to the display to play the second video signal when the display controller is not in normal operation state,
wherein the bridge circuit comprises a video receiver, a timing detector and a selector, wherein the video receiver is connected with the display controller, the timing detector is connected with the video receiver and the selector,
the video receiver is configured to receive the first video signal output by the display controller, transmit the first video signal to the selector, and transmit a timing signal of the first video signal and a frame data of the first video signal to the timing detector;

the timing detector is configured to detect whether the timing signal of the first video signal and the frame data of the first video signal are normal or not and transmit a detection result to the selector, wherein the timing detector is further configured to pre-store a field synchronization signal threshold, a row synchronization signal threshold and a data enable signal threshold of the first video signal output by the display controller under normal operation state, pre-store a preset pixel row data threshold and a preset pixel column data threshold, detect the timing signal of the first video signal and the frame data of the first video signal transmitted by the video receiver based on the pre-stored signal thresholds, wherein the timing signal comprises a field synchronization signal of the first video signal, a row synchronization signal of the first video signal and a data enable signal of the first video signal, and the frame data comprises pixel row data and pixel column data, when the field synchronization signal, the row synchronization signal and the data enable signal, the pixel row data and the pixel column data all meet corresponding signal threshold, determine an initialization of the display controller being completed and the display controller entering a normal operation state, and output a first detection result to the selector.

2. The display control system according to claim 1, wherein the bridge circuit further comprises a memory and a transmitter, wherein the selector is connected with the memory and the transmitter;

the memory is configured to store a second video signal and transmit the second video signal to the selector;

the selector is configured to selectively output the first video signal or the second video signal to the transmitter according to the detection result; and the transmitter is connected with the display and configured to transmit the first video signal or the second video signal received to the display.

3. The display control system according to claim 2, wherein the timing detector is further configured to output a second detection result when any one of the timing signal of the first video signal and the frame data of the first video signal does not meet the corresponding preset thresholds; and the selector is configured to selectively output the first video signal to the transmitter according to the first detection result and selectively output the second video signal to the transmitter according to the second detection result.

4. The display control system according to claim 1, wherein the second video signal is a boot screen.

5. The display control system according to claim 1, wherein the bridge circuit is a field programmable gate array (FPGA).

6. The display control system according to claim 2, wherein the video receiver comprises a first communication interface configured to establish a communication connection with the display controller; and the transmitter comprises a second communication interface configured to establish a communication connection with the display.

7. The display control system according to claim 6, wherein the first communication interface is further configured to receive a first video signal output by the display controller; and the second communication interface is further configured to transmit the first video signal or the second video signal received to the display.

8. The display control system according to claim 6, wherein the first communication interface and the second communication interface are both Video-By-One (VBO) interfaces.

9. A display apparatus, comprising the display control system according to claim 1.

10. A controlling method, applied to the display control system according to claim 1, comprising:

determining, by the bridge circuit of the display control system, whether the display controller is in normal operation state according to the first video signal received, wherein the first video signal is output by the display controller according to the external video source; and outputting the first video signal to the display to play the first video signal when the display controller is in normal operation state, and outputting the second video signal pre-stored to the display to play the second video signal when the display controller is not in normal operation state, wherein the bridge circuit comprises a video receiver, a timing detector and a selector, determining whether the display controller is in normal operation state according to the first video signal received comprises:

receiving, by the video receiver, the first video signal output by the display controller, transmitting the first video signal to the selector, and transmitting a timing signal of the first video signal and a frame data of the first video signal to the timing detector; and detecting, by the timing detector, whether the timing signal of the first video signal and the frame data of the first video signal are normal or not and transmitting a detection result to the selector, wherein detecting, by the timing detector, whether the timing signal of the first video signal and the frame data of the first video signal are normal or not and transmitting a detection result to the selector comprises:

pre-storing, by the timing detector, a field synchronization signal threshold, a row synchronization signal threshold and a data enable signal threshold of the first video signal output by the display controller under normal operation state, pre-storing, by the timing detector, a preset pixel row data threshold and a preset pixel column data threshold, detecting, by the timing detector, the timing signal of the first video signal and the frame data of the first video signal transmitted by the video receiver based on the pre-stored signal thresholds, wherein the timing signal comprises a field synchronization signal of the first video signal, a row synchronization signal of the first video signal and a data enable signal of the first video signal, and the frame data comprises pixel row data and pixel column data, when the field synchronization signal, the row synchronization signal and the data enable signal, the pixel row data and the pixel column data all meet corresponding signal threshold, determining, by the timing detector, an initialization of the display controller being completed and the display controller entering a normal operation state, and outputting, by the timing detector, a first detection result to the selector.

11. The control method according to claim 10, wherein the bridge circuit further comprises a memory and a transmitter, wherein outputting the first video signal to the display to play the first video signal when the display controller is in normal operation state and outputting the second video signal pre-stored to the display to play the second video signal when the display controller is not in normal operation state comprises:

transmitting, by the memory, the second video signal pre-stored to the selector;

selectively outputting, by the selector, the first video signal or the second video signal to the transmitter according to the detection result; and transmitting, by the transmitter, the first video signal or the second video signal received to the display to play the video signal received.

12. The control method according to claim 11, wherein detecting, by the timing detector, whether the timing signal of the first video signal and the frame data of the first video signal are normal or not and transmitting the detection result to the selector further comprises:

outputting a second detection result when any one of the timing signal of the first video signal and the frame data of the first video signal does not meet the corresponding preset thresholds; and selectively outputting, by the selector, the first video signal or the second video signal to the transmitter according to the detection result comprises:

selectively outputting, by the selector, the first video signal to the transmitter according to the first detection result, or selectively outputting, by the selector, the second video signal to the transmitter according to the second detection result.

13. The control method according to claim 10, wherein the video receiver comprises a first communication interface, and the transmitter comprises a second communication interface;

before determining whether the display controller is in normal operation state according to the first video signal received, the control method further comprises:
establishing a communication connection with the display controller using the first communication interface; and
establishing a communication connection with the display using the second communication interface.

14. The control method according to claim 13, wherein receiving, by the video receiver, the first video signal output by the display controller comprises:

receiving the first video signal output by the display controller using the first communication interface; and transmitting, by the transmitter, the first video signal or the second video signal received to the display to play the video signal received, comprises:

transmitting the first video signal or the second video signal received to the display using the second communication interface.

15. The control method according to claim 13, wherein the first communication interface and the second communication interface are both Video-By-One (VBO) interfaces.

16. The control method according to claim 10, wherein the second video signal is a boot screen.

17. A non-transitory computer readable storage medium, storing a computer program, wherein the control method according to claim 10 is implemented when the computer program is executed by a processor.

18. A computer device, comprising: a processor and a memory storing a computer program that is executable on the processor, wherein the control method according to claim 10 is implemented when the computer program is executed by the processor.

* * * * *